(12) United States Patent
Oppici et al.

(10) Patent No.: US 9,446,917 B2
(45) Date of Patent: Sep. 20, 2016

(54) PALLETISING DEVICE

(71) Applicant: A.C.M.I.— SOCIETA' PER AZIONI, Fornovo Di Taro (PR) (IT)

(72) Inventors: Giorgio Oppici, Solignano (IT); Giacomo Magri, Beduzzo (IT)

(73) Assignee: A.C.M.I.— SOCIETA' PER AZIONI, Fornovo di Taro (Parma) (IT)

( * ) Notice: Subject to any disclaimer, the term of this patent is extended or adjusted under 35 U.S.C. 154(b) by 0 days.

(21) Appl. No.: 14/764,440

(22) PCT Filed: Feb. 27, 2014

(86) PCT No.: PCT/IB2014/000232
§ 371 (c)(1),
(2) Date: Jul. 29, 2015

(87) PCT Pub. No.: WO2014/135950
PCT Pub. Date: Sep. 12, 2014

(65) Prior Publication Data
US 2015/0375945 A1    Dec. 31, 2015

(30) Foreign Application Priority Data
Mar. 4, 2013 (IT) .............................. RE2013A0013

(51) Int. Cl.
*B65G 57/03* (2006.01)
*B65G 57/24* (2006.01)
*B65G 57/00* (2006.01)

(52) U.S. Cl.
CPC .............. *B65G 57/24* (2013.01); *B65G 57/005* (2013.01); *B65G 57/03* (2013.01)

(58) Field of Classification Search
CPC .... B65G 57/24; B65G 57/06; B65G 57/245; B65G 27/005
USPC ......... 414/277, 278, 279, 788, 789.5, 789.9, 414/790, 790.1, 790.3, 790.4, 790.6, 790.8, 414/790.9, 794.3, 799
See application file for complete search history.

(56) References Cited

U.S. PATENT DOCUMENTS 3,696,945 A * 10/1972 Bobolts .................. B65G 57/08
                                                                    414/790.7
4,032,021 A *  6/1977 Mabey .................. B65G 59/005
                                                                    414/564

(Continued)

FOREIGN PATENT DOCUMENTS

DE       202006018017 U1    8/2007
FR    WO 2010109140 A2 *   9/2010  ........... B65G 57/245

(Continued)

*Primary Examiner* — Gregory Adams
(74) *Attorney, Agent, or Firm* — Volpe and Koenig, P.C.

(57) ABSTRACT

A palletizing device (10) comprising a lower plane (15) able to supportingly receive a pallet (5) and a loading device (100) vertically mobile above the lower plane (15) and comprising an upper platform (110), superposed in plan view on the lower plane (15) and provided with variable-configuration support means (112) and activating means able to cyclically move the support means (112) between a closed configuration, in which the define a support for a first layer of products (4) to be palletized, and an open configuration, in which they remove the support in order to release the first layer of products (4) downwards, in which the loading device (100) comprises a storing platform (120) defining a support for a second layer of products (4) to be palletized and flanked to the upper platform (110).

9 Claims, 10 Drawing Sheets

(56) References Cited

U.S. PATENT DOCUMENTS

| | | | |
|---|---|---|---|
| 4,205,934 A | 6/1980 | Hartley et al. | |
| 5,564,890 A * | 10/1996 | Knudsen, Jr. | B65G 1/1371 |
| | | | 414/802 |
| 6,048,164 A * | 4/2000 | Ritola | B65G 57/005 |
| | | | 414/789.5 |
| 7,393,176 B2 * | 7/2008 | Bolzani | B65G 57/005 |
| | | | 414/792.6 |
| 7,721,654 B2 * | 5/2010 | Ueda | B66F 9/072 |
| | | | 104/106 |
| 7,850,415 B2 * | 12/2010 | Blanc | B65G 57/24 |
| | | | 414/791.1 |
| 2011/0277423 A1 * | 11/2011 | Magri | B65G 57/035 |
| | | | 53/443 |

FOREIGN PATENT DOCUMENTS

| | | | | |
|---|---|---|---|---|
| GB | 2003818 A | | 3/1979 | |
| IT | 1724219 A2 * | | 11/2006 | B65G 57/06 |
| IT | WO 2010086292 A1 * | | 8/2010 | B65G 57/035 |
| JP | 08133416 A * | | 5/1996 | |

* cited by examiner

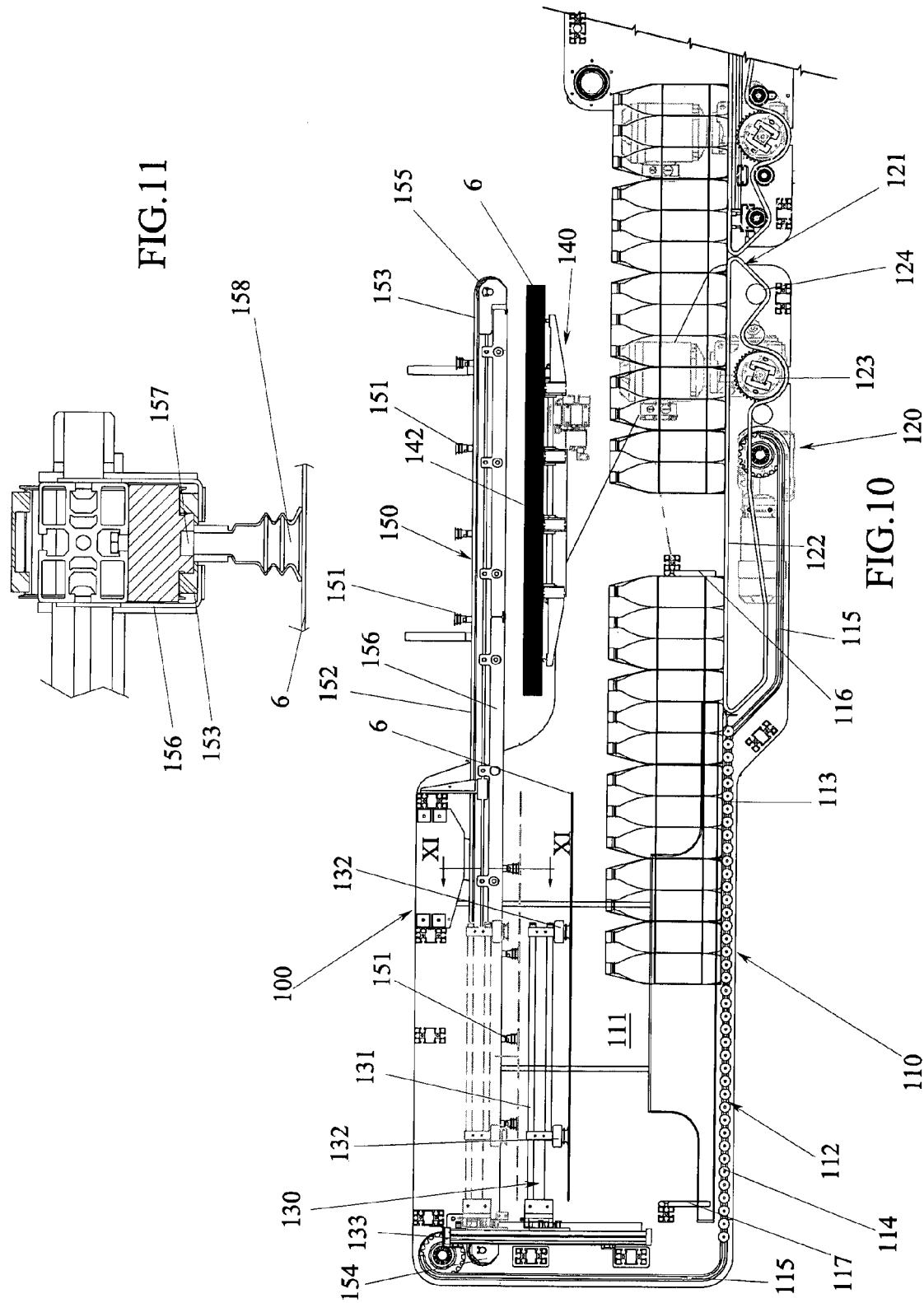

PALLETISING DEVICE

TECHNICAL FIELD

The present invention relates to a palletizing device, i.e. an automatic device for stacking packed products on pallets, such as for example packs of bottles. In more detail, the present invention relates to a palletizing device of a type comprising a fixed platform able to support the pallet arranged along the transfer line thereof, a supply line of the products arranged at a fixed height, a mobile upper platform vertically aligned with the fixed platform.

PRIOR ART

As is known, in a palletizing device of the above type, the upper platform comprises variable-configuration support means, typically a slatted platform, which support means are moved by relative activating means between a closed configuration, in which they exhibit a load plane able to restingly support the products to be palletized, and an open configuration, in which they remove the support, letting the products fall downwards by force of gravity.

The palletizing device is located on a more complex palletizing plant which comprises, connected to the upper platform, a further following platform which is also vertically mobile and is such as to:
collect a layer of products to be palletized by the conveyor line and group them, placing itself at the level of the line, move vertically such as to place itself at the level at which the upper platform is located in the given instant and
transfer the layer of products to be palletized on the support means of the upper platform.

In practice, when the support means are in the closed configuration, the products to be palletized are raised horizontally on the loading plane, in such a way as to form thereon a layer of grouped products, after which the support means are brought into the open configuration, such that the layer of products rests directly on the pallet that is borne by the underlying lower platform.

At this point, the upper platform is raised by a quantity that is substantially equal to the height of the products collected on the pallet, and the support means of the upper platform are brought into the closed configuration, in order thus to be able to receive a further layer of products.

This cycle is repeated several times up to the formation on the pallet of a complete stack of products.

At the end of operations, the lower platform is activated such that the completely loaded pallet can be distanced from the conveyor line towards further operating stations, and be replaced by another and empty pallet.

Further, the palletizing plant generally comprises means for positioning a cardboard sheet between a layer of products and another, aimed at giving the stack of palletized products a greater stability.

In particular, use is known of a collecting and positioning turret of a single cardboard sheet located by a side of the palletizing device, which comprises a mobile arm able to collect the cardboard sheet from a stack of sheets and position it on the layer of products once the layer is made available on the upper platform.

If on the one hand these palletizing plants have shown a particular effectiveness in the carrying-out of the stacking operations of the products and the palletization thereof, a drawback encountered is that they exhibit a relatively low efficiency due to the existence of numerous dead times necessary for ensuring transfer and positioning of the layer of products to be palletized, as well as the cardboard sheet, among the various components that constitute the plant and which are dedicated to the palletizing device.

In particular, once the upper platform has unloaded the layer of products on the pallet it is necessary to wait for the follower platform to take delivery from the conveyor and grouping line of the products to be palletized of a new layer and returns to the level reached by the upper platform in order to transfer the new layer of products thereon.

Further, once the new layer of products is received by the upper platform, before it is stacked on the pallet it is necessary to wait for the necessary time so that the collecting and positioning turret of the cardboard sheet positions the sheet restingly on the new layer of products.

An example of a palletizing device, according to the preamble of claim 1, is disclosed in the U.S. Pat. No. 4,205,934.

An aim of the present invention is to obviate the mentioned drawbacks of the prior art, thus increasing the efficiency of the whole palletizing plant, with a solution that is simple, rational and relatively inexpensive.

The aims are attained by the characteristics of the invention reported in the independent claim. The dependent claims delineate preferred and/or particularly advantageous aspects of the invention.

DISCLOSURE OF THE INVENTION in particular, the invention discloses a palletizing device comprising a lower plane able to supportingly receive a pallet and a loading device that is vertically mobile above the lower plane and comprising an upper platform, superposed in plan view on the lower plane and provided with support means having a variable configuration and activating means able to cyclically move the support means between a closed configuration, in which they define a support for a first layer of products to be palletized, and an open configuration, in which they remove the support in order to release the first layer of products downwards.

According to the invention, the loading device comprises a storage platform defining a support for a second layer of products to be palletized which is flanked to and solidly constrained to the upper platform.

Thanks to this solution, the waiting time required for depositing a following layer of products on the pallet can be significantly reduced, making the whole palletizing plant more efficient.

In a further aspect of the invention the loading device comprises a positioning organ, overlying the upper platform and located on-board the loading device, able to position and release a sheet support element on the first layer of products.

Thanks to this it is possible to further reduce the predisposing and depositing times of a layer of products on pallets, considerably improving both the stability of the stack and the efficiency of the whole palletizing plant.

A still further aspect of the invention is that the loading device comprises a storage plane of at least a stack of sheet elements commanded by the positioning organ.

In this way, a quantity of sheet elements is made available on the loading device, such as to be able to carry out a depositing of a determinable number of layers of products without any interruption of the palletizing plant and with a considerable saving in terms of time, while at the same time reducing the overall volumes of the palletizing plant.

The loading device advantageously comprises conveyor means of a sheet element at a time which means are provided with a gripping system of a sheet element of the stack of sheet elements and a translation system of the gripped sheet element, able to bring the gripped sheet element into an unloading position, in which the sheet is substantially superposed in plan view on the first layer of products.

In this way the positioning of the sheet element on the first layer of products to be stacked on the pallet and especially fast, effective and precise.

The gripping system advantageously comprises at least a first sucker that can be arranged in a loading position, in which it is superposed above the stack of sheet elements, for gripping the uppermost sheet element from above, the translation system being able to translate the first sucker alternatively between the loading position and the unloading position.

Thanks to this solution, the gripping of the sheet element to be positioned on the first layer of products is particularly effective and in no way ruins the sheet element.

Further, the first sucker comprises a deformable cup in which a conduit opens that is associated to an aspirating group able to define a slight depression at the internal zone of the deformable cup.

In this way the grip of the sheet element is particularly stable and enables effective transport of the sheet element from the loading position to the unloading position.

In a further aspect of the invention the positioning organ comprises at least an arm, for example provided with at least a second sucker, and vertically mobile between a raised position, in which it is at a higher level than the first sucker in the unloading position, and a lowered position, in which it is resting on the first layer of products with the sheet element interposed.

With this solution, the positioning organ accompanies the positioning of the sheet element on the first layer of products, maintaining it perfectly centred and stably fixed thereto, from the moment of detachment thereof from the first suckers up to the release of the first layer of products on the pallet (or on the stack of layers of products already palletized).

The loading device advantageously comprises at least two parallel sides, which are associated to activating means which move at least one of the sides horizontally nearingly and distancingly to and from the other edge, such as to clamp and release the first layer of products which is rested on the support means in a closed configuration.

In this way the first layer of products can be perfectly centred with respect to the support means and with all the products perfectly compacted, in such a way as to be released perfectly centred and balanced on the pallet.

A still further aspect of the invention comprises a palletizing plant which includes at least a palletizing device, as described above, a conveyor and grouping line of products to be palletized located upstream of the palletizing device with respect to the advancement direction of the products along the conveyor and grouping line and at least a follower platform interposed between the conveyor and grouping line and the palletizing device is vertically mobile independently of the palletizing device in such a way as to position itself, alternatively, at the level of the conveyor and grouping line for unloading a layer of products therefrom and at the level of the palletizing device for loading the layer of products onto the storage platform of the palletizing device.

A further aspect of the invention discloses a loading device which is also independently protectable from the one detailed above, which comprises a lower plane able to supportingly receive a pallet and a loading device positioned above the lower plane (vertically mobile or fixed) and comprising an upper platform, superposed in plan view on the lower plane and provided with support means having a variable configuration and activating means able to cyclically move the support means between a closed configuration, in which they define a support for a first layer of products to be palletized, and an open configuration, in which they remove the support in order to release the first layer of products downwards, in which the loading device comprises a positioning organ able to position or release a support sheet element onto the first layer of products.

Further, the further palletizing device can comprise a storage plane and conveyor means as described above.

BRIEF DESCRIPTION OF THE DRAWINGS

Further characteristics and advantages of the invention will emerge from a reading of the following description provided by way of non-limiting example, with the aid of the figures illustrated in the accompanying tables.

FIG. 10 is the loading device of FIG. 7 in a fourth operating configuration.

FIG. 11 is a view along section line XI-XI of FIG. 10.

BEST WAY OF CARRYING OUT THE INVENTION

Figure 1:
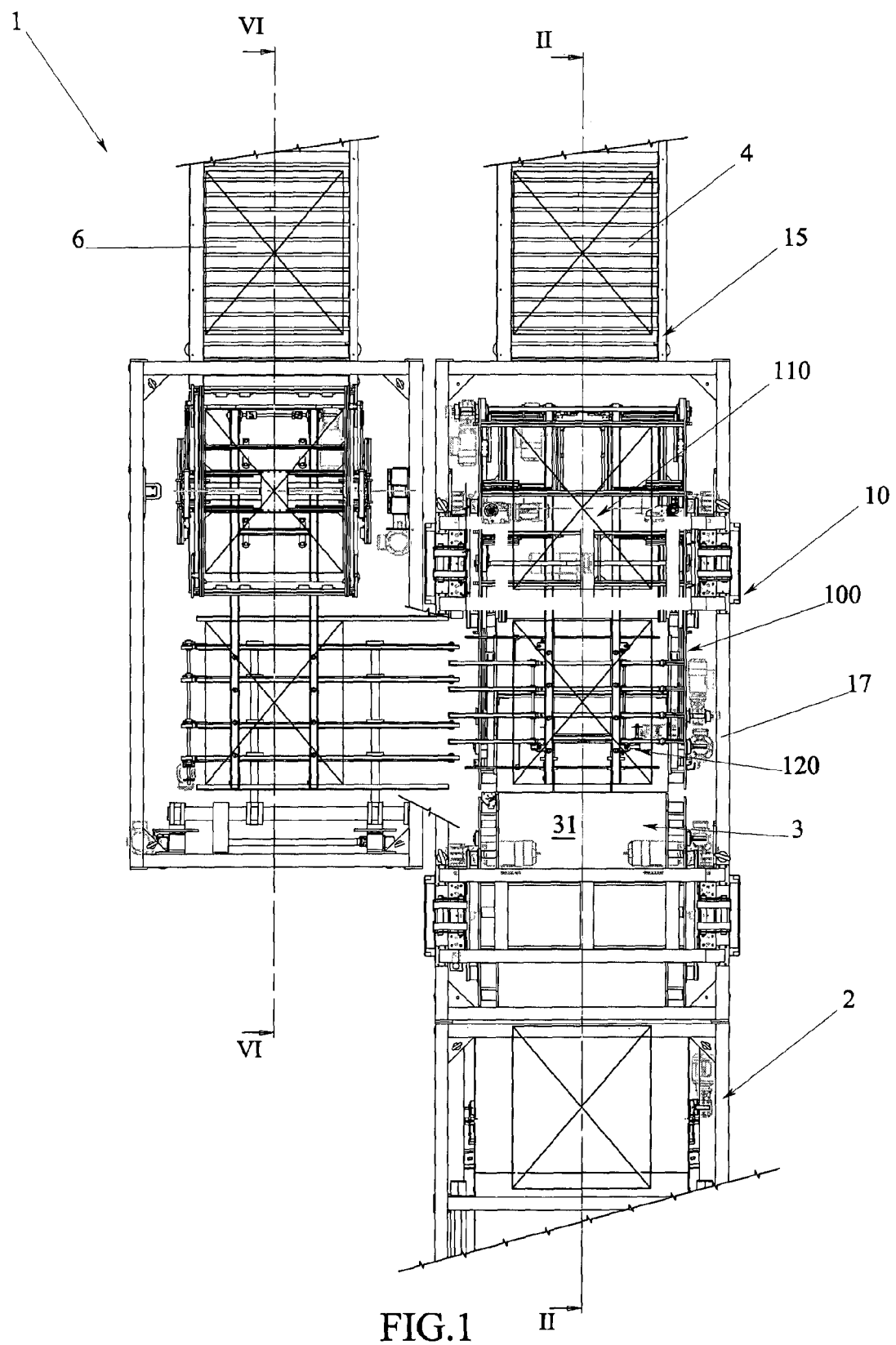
FIG. 1 is a view from above of a palletizing plant according to the invention.
Figure 2:
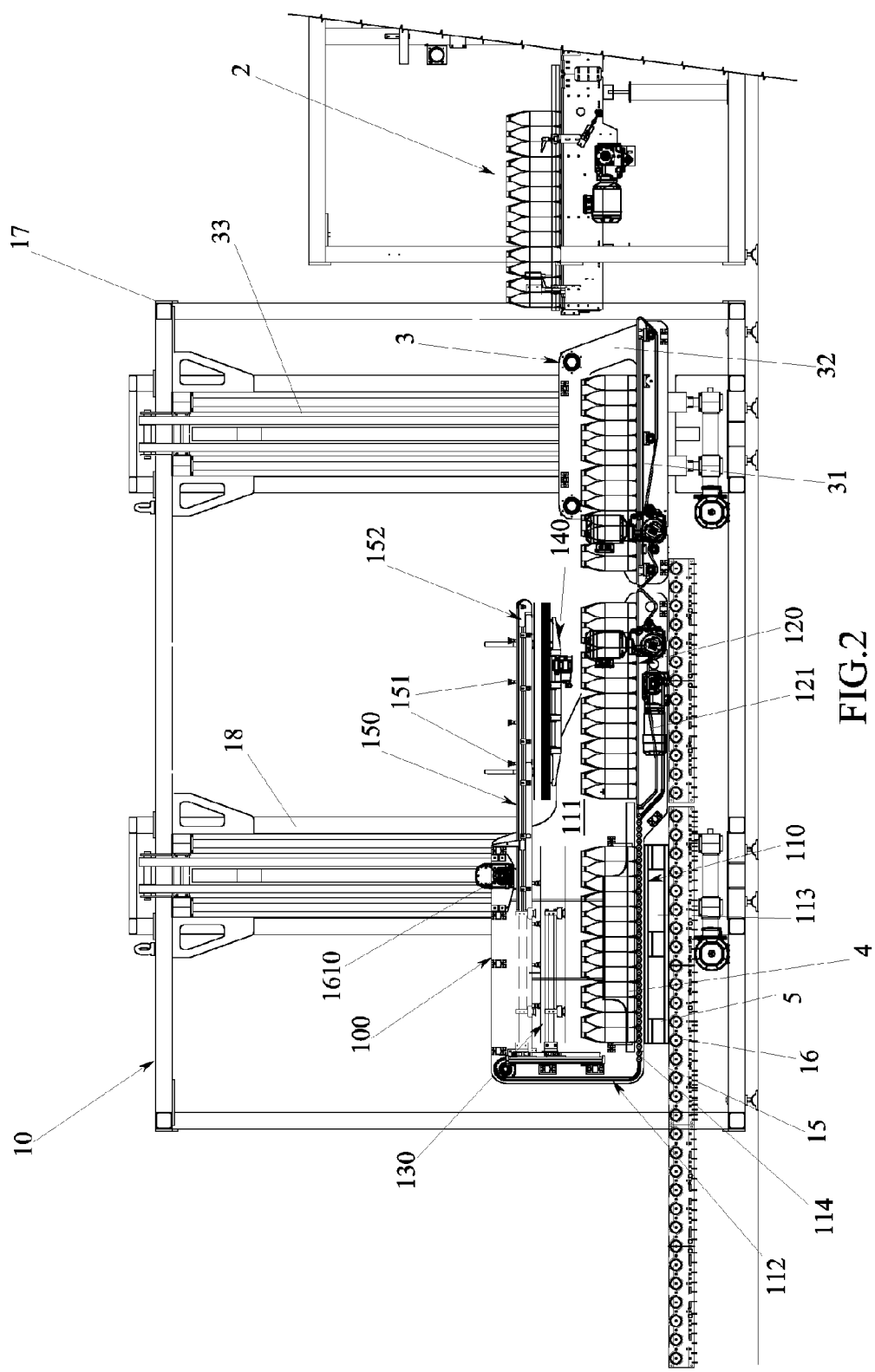
FIG. 2 is a view along section line II-II of FIG. 1, with the palletizing device in a first operating configuration.
Figure 3:
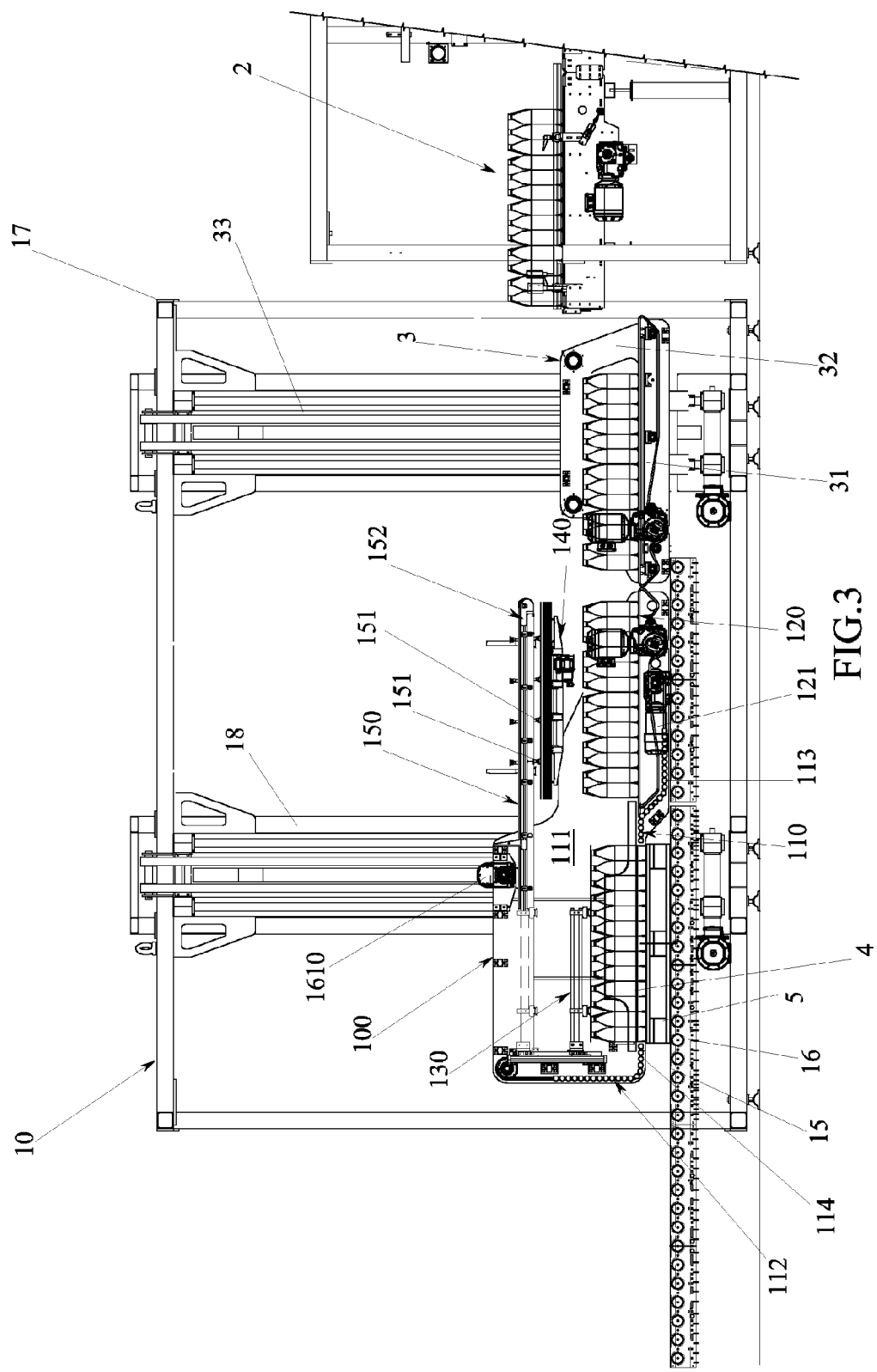
FIG. 3 is a view of FIG. 2, with the palletizing device in a second operating configuration.
Figure 4:
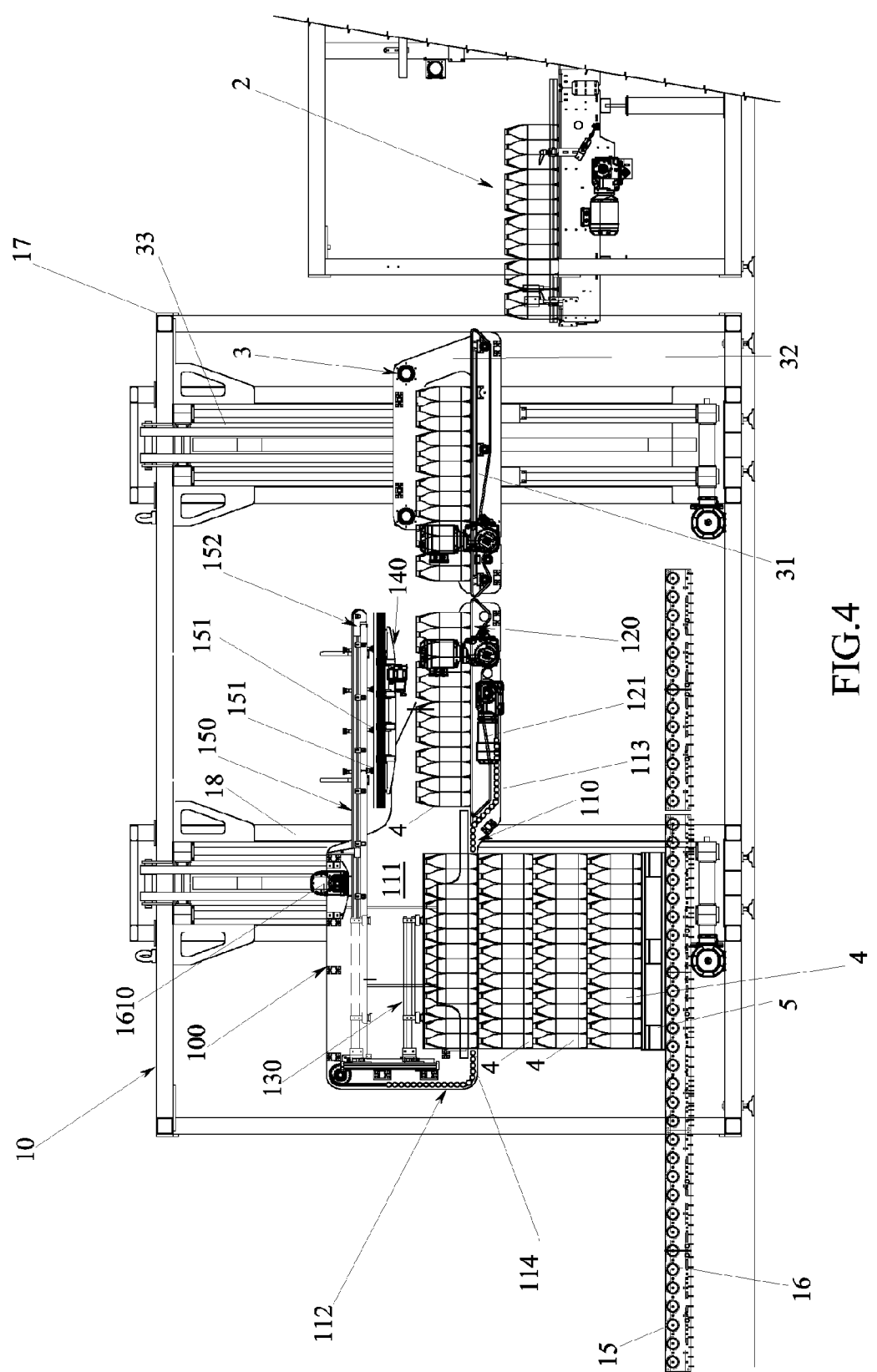
FIG. 4 is a view of FIG. 2 with the palletizing device in a third operating configuration.
Figure 5:
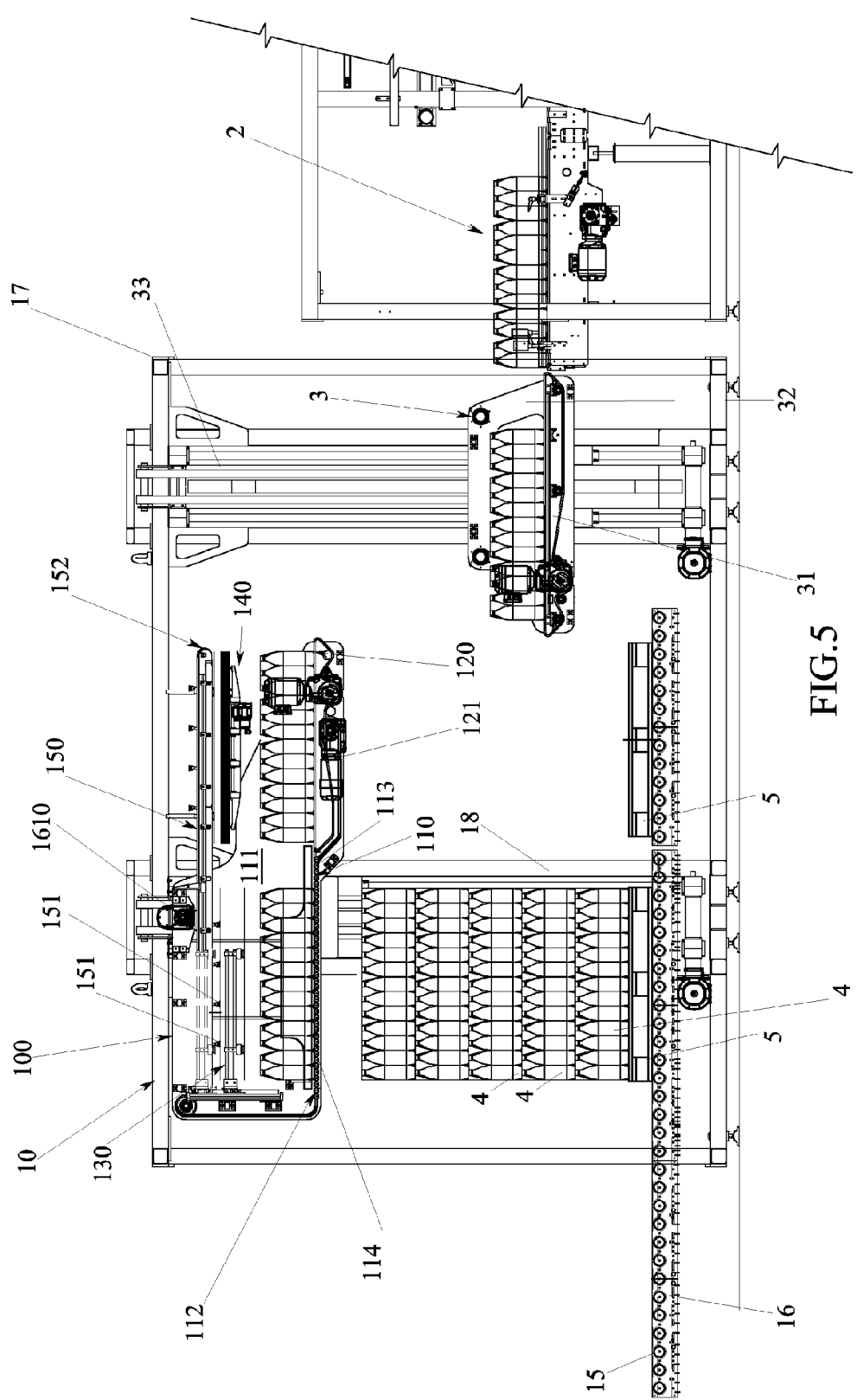
FIG. 5 is a view of FIG. 2 with the palletizing device in a fourth operating configuration.

With particular reference to the figures, 10 denotes in its entirety a device, in palletizing plants 1, for palletizing loads 4 of bottles, cans, jars or the like, without excluding the possible of its being used for palletizing other packed products.

The palletizing device 10 (FIGS. 2-5) comprises a lower plane 15.

The lower plane 15 comprises a motorized roller plane 16 able to define a horizontal loading plane for a pallet 5 for loading layers of loads 4 and overall defines a conveyor line for the loaded pallets 5 of the stack of loads 4.

In particular, the motorized roller plane 16 is served by a loading roller plane able to advance empty pallets 5 towards the motorized roller 16 as is known to the technical expert in the sector.

Naturally the motorized roller plane 16 can be replaced by other types of motorized conveyors of known type.

The palletizing device 10 comprises a loading device 100 which is superposed in plan view on at least a tract of the lower plane 15 and is vertically mobile alternatively between at least a lowered configuration in which it is close to the lower plane 15 and at least a raised configuration in which it is distanced therefrom.

The palletizing device 10 comprises a portal structure 17 comprising two vertical columns 18 respectively located on opposite sides of the motorized roller plane 16.

Each vertical column 18 defines a vertical guide for the loading device 100.

The loading device 100 (with particular reference to FIGS. 7-10) comprises an upper platform 110 able to contain a first compacted layer of loads 4 such as to occupy an area that is substantially equal to the support area defined by a pallet 5.

In practice, the loading device 100 comprises a pair of lateral flanks 111 that are vertical and opposite (of which one only is visible in the figures), between which a shutter 112 is interposed.

The shutter 112 can take on a closed configuration (FIG. 7) in which a horizontal loading plane is made available and is able to restingly support the loads 4, and an open configuration (FIG. 8) in which it leaves a passage open in such a way as to enable the descent of the first layer of loads 4 by force of gravity.

In practice, the shutter 112 in the open configuration is able to define an area that is substantially equal to the support area defined by the pallet 5.

In more detail, the shutter 112 comprises two groups of support rollers, denoted respectively by 113 and 114, which are horizontal and the opposite ends of which are associated to meshes of two identical guide and support chains 115, which are opposite and respectively associated to the two lateral flanks 111.

Each guide and support chain 115 lies in a vertical plane and is at least partially wound about an assembly of respective cogged pinions.

All the cogged pinions can be connected to one another, and in any case are such that the two guide and support chains 115 always slide in synchrony and at the same velocity.

The support rollers 113 and 114 are fixed, parallel to one another (perpendicular to the lateral flanks 111) and neared to one another.

In this way, the two groups of support rollers 113 and 114, when neared to one another, take on a closed configuration, in which they are coplanar and neared, and wherein they thus define a single load plane able to support the loads 4.

Starting from this closed configuration, the guide and support chains 115 can be activated to slide, in such a way that the groups of support rollers 113 and 114 reciprocally distance by moving in opposite directions, up to reaching an open configuration in which they leave a passage open below the loads 4.

The guide and support chains 115 can go from the open configuration to being activated to slide in the opposite direction, such as to return the groups of support rollers 113 and 114 into the initial closed configuration.

The activating of the guide and support chains 115 (FIG. 7) is carried out by one or more motors (of known type), each able to rotate at least one of the cogged pinions on which the chains are wound.

For each first layer of loads 4 to be positioned at the centre of the load plane, the loading device 100 comprises a thrust organ 116 serving the upper platform 110, which is provided with a to and fro up and down motion in a horizontal and parallel direction to the load plane defined by the groups of support rollers 113 and 144 in a closed position, and to rise and fall.

The thrust organ 116, i.e. a transversal bar located with a longitudinal axis parallel to the rollers of the support roller groups 113 and 114, is supported at the lateral flanks 21 of the loading device 100 and guided to move in an up and down and to and fro motion.

During the forward travel, the thrust organ 116 is lowered such as to push an entire first layer of loads 4 to slide on the support rollers 113 and 114 (idle rollers) up to halting against an endrun element 117, also realized by a bar positioned with a longitudinal axis parallel to the rollers of the groups of support rollers 113 and 114, which is particularly fixed to the lateral flanks 21.

During the return travel, the thrust organ 116 is raised such as to pass above the first layer of loads 4.

The thrust organ 116 is activated by motor means 1610 of known type.

The loading device 100 comprises a storage platform 120 defining a support for a second layer of loads 4 to be palletized, for example also compacted such as to occupy an area that is substantially equal to the support area defined by a pallet 5, which is flanked (i.e. aligned and located upstream along the advancement direction imparted by the loading device 100, in particular by the thrust organ 116, on the first layer of loads 4) to the upper platform 110.

Thanks to the storage platform 120 and the upper platform 110, the loading device 100 is able to support two layers of loads 4 at a time, flanked/aligned horizontally.

In practice, the storage platform 120 is supported by the lateral flanks 111 which support the upper platform 110 and precedes it in the advancement direction of the loads 4 towards the upper platform.

The storage platform 120 in the illustrated example comprises a conveyor belt 121 which is coplanar and neared to the load plane defined by the closed shutter 112.

Further, when the shutter 112 is in the open configuration, the group of support rollers 113 can be arranged substantially below the storage platform 120.

The conveyor belt 121 can transport the second layer of loads 4 towards the upper platform 110, which second layer is in arrival for example from a conveyor and grouping line 2 of a palletizing plant 1 (as will be more fully explained in the following), causing it to rise onto the load plane defined by the shutter 112.

In practice the conveyor belt 121 comprises one or more flexible belts 122 (or chains) each of which is loop-wound on itself and is wound on at least a drive pulley 123, keyed on the output shaft of a motor 124 supported by the lateral flanks 21, and one or more driven pulleys 125 singly keyed on respective idle shafts parallel and rotatably associated to the lateral flanks.

In practice, the idle rollers are arranged parallel to the rollers of the groups of support rollers 113 and 114 of the upper platform 110.

The active upper branch of the belts 122 of the storage platform 120 is substantially coplanar to the plane of the upper platform (of the groups of support rollers 113 and 114) when it is in the closed configuration.

It is further possible for the storage platform 120 to comprise, alternatively, a different type of conveyor, for example a motorized roller or the like.

The loading device 100 further comprises a positioning organ 130 which is able to position and release (as will more fully emerge in the following) a sheet element, for example a cardboard sheet 6, on the first layer of loads 4 centred and resting on the shutter 112.

The loading device 100 in particular comprises a storage plane 140 of at least a stack of cardboard sheets 6 which loading device 100 serves the positioning organ 130.

Figure 6:
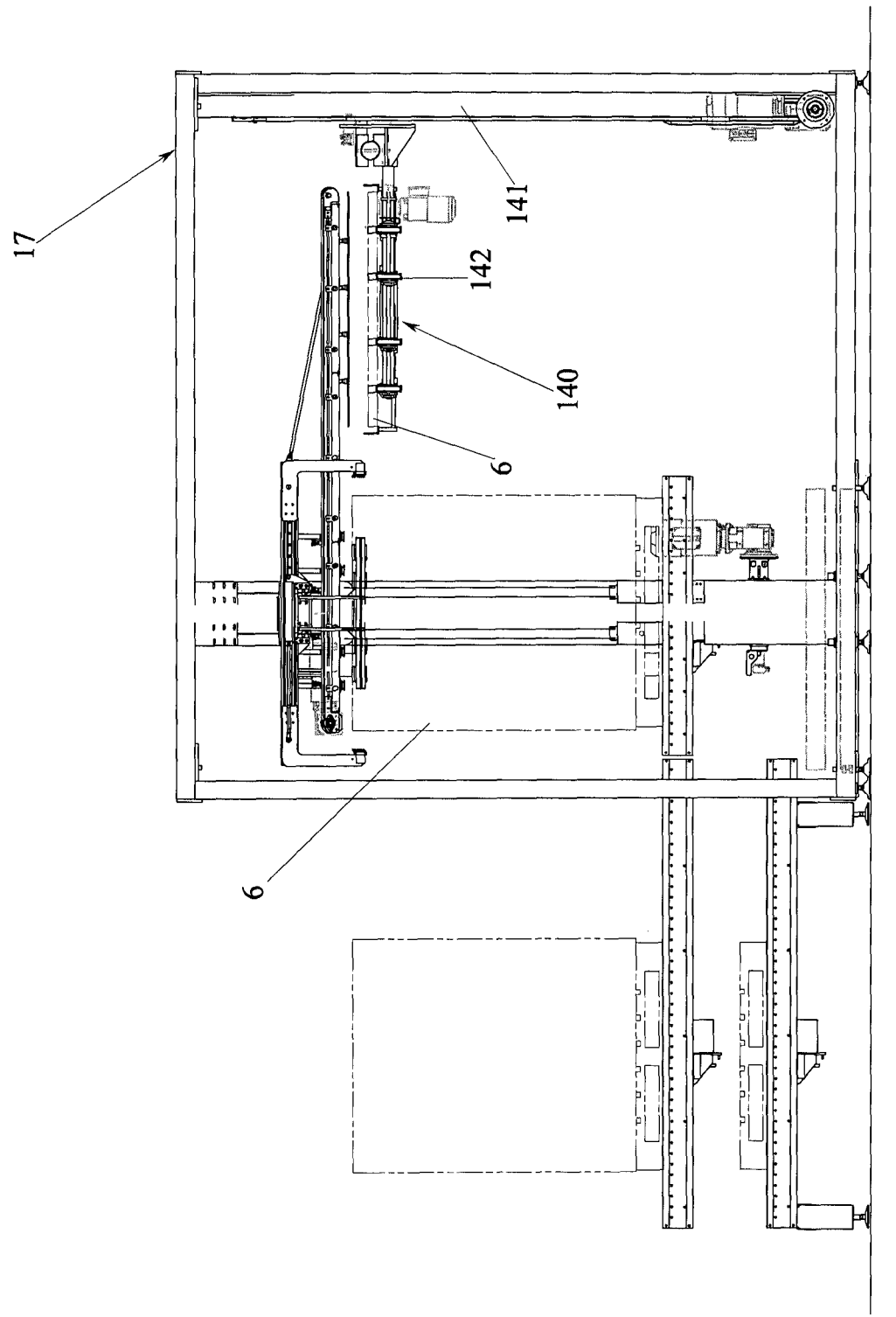
FIG. 6 is a view along the section line VI-VI of FIG. 1.
Figure 7:
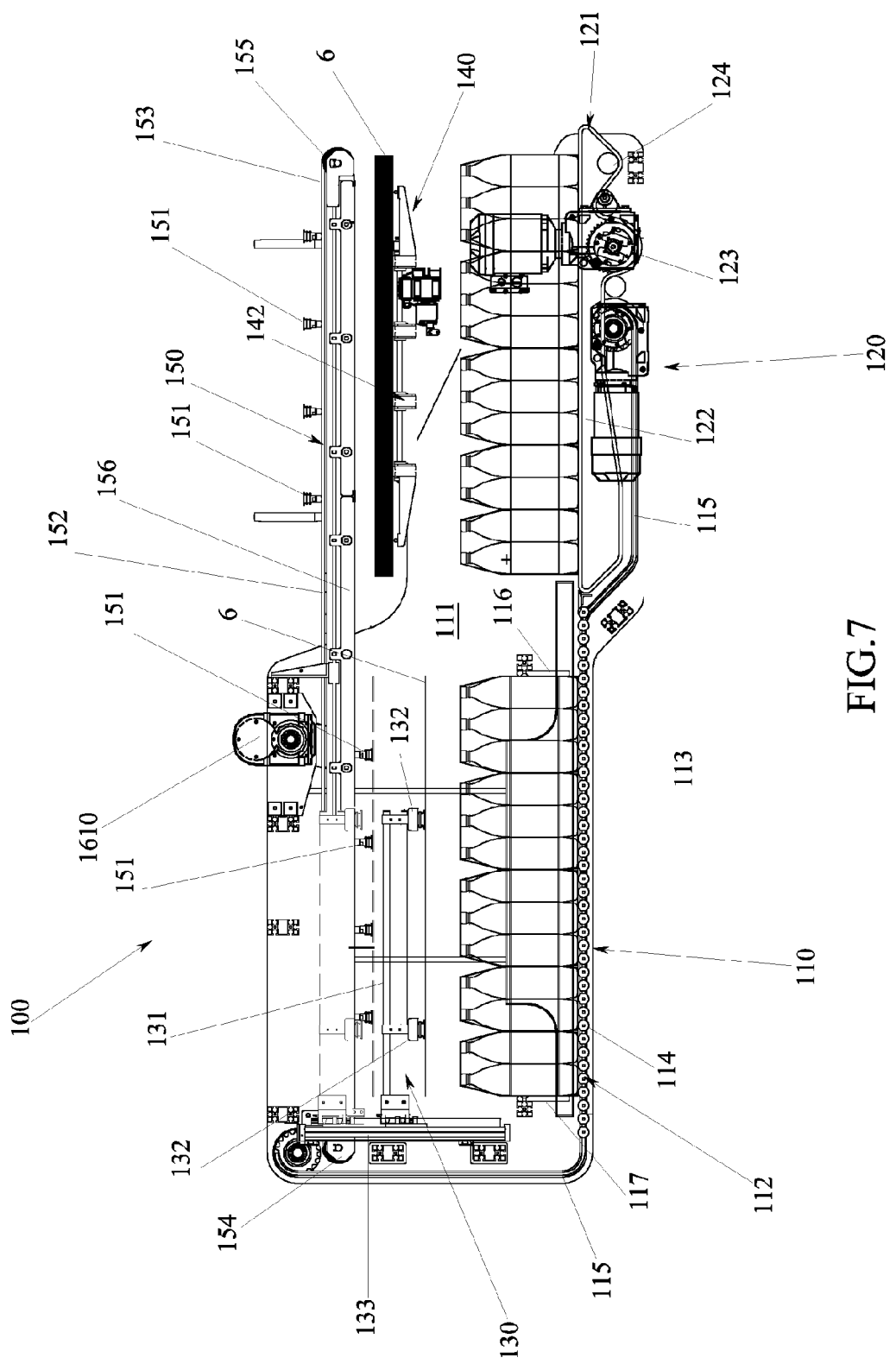
FIG. 7 is a detail of the loading device of the invention, in a first operating configuration.
Figure 8:
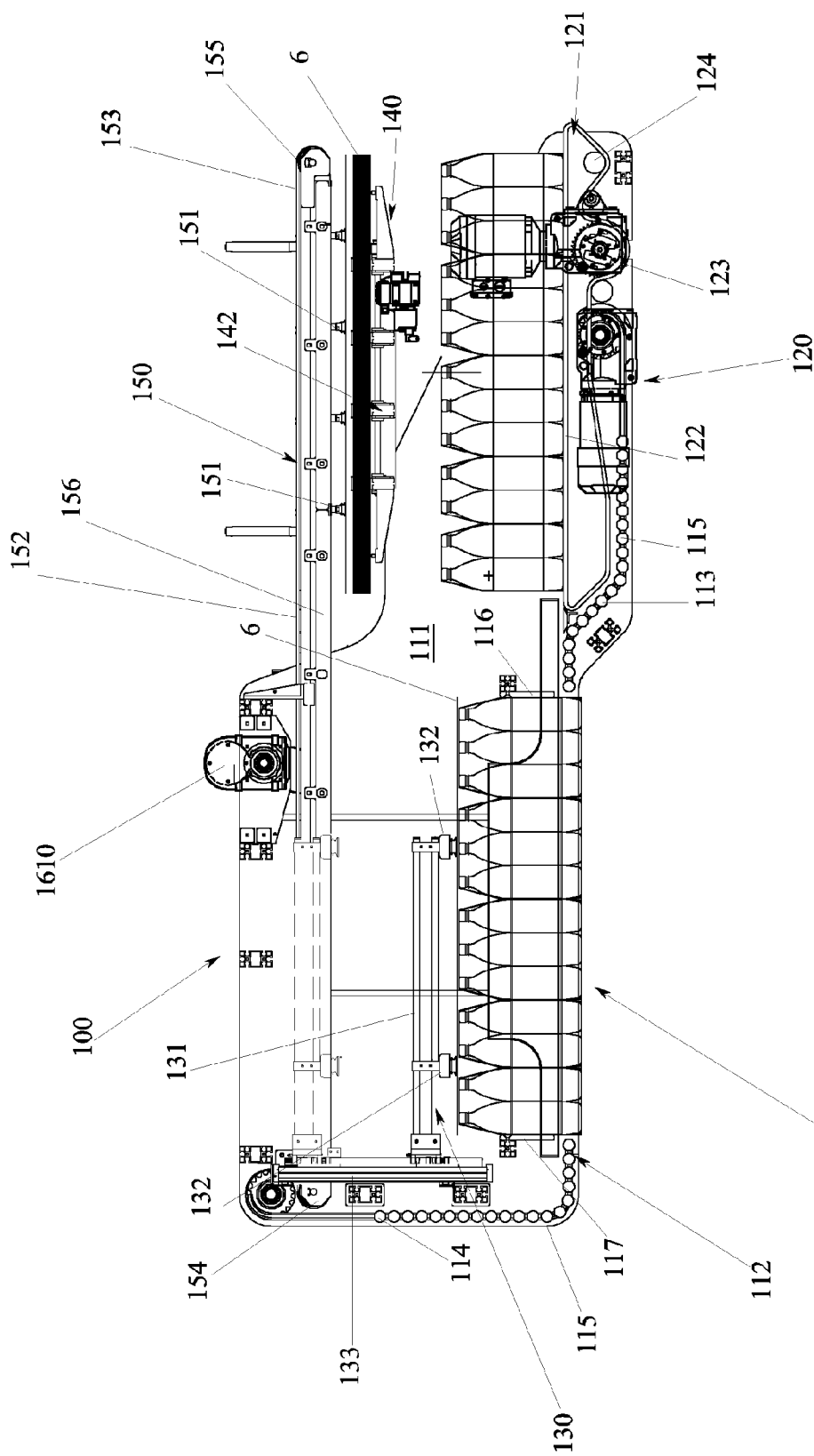
FIG. 8 is the loading device of FIG. 7, in a second operating configuration.
Figure 9:
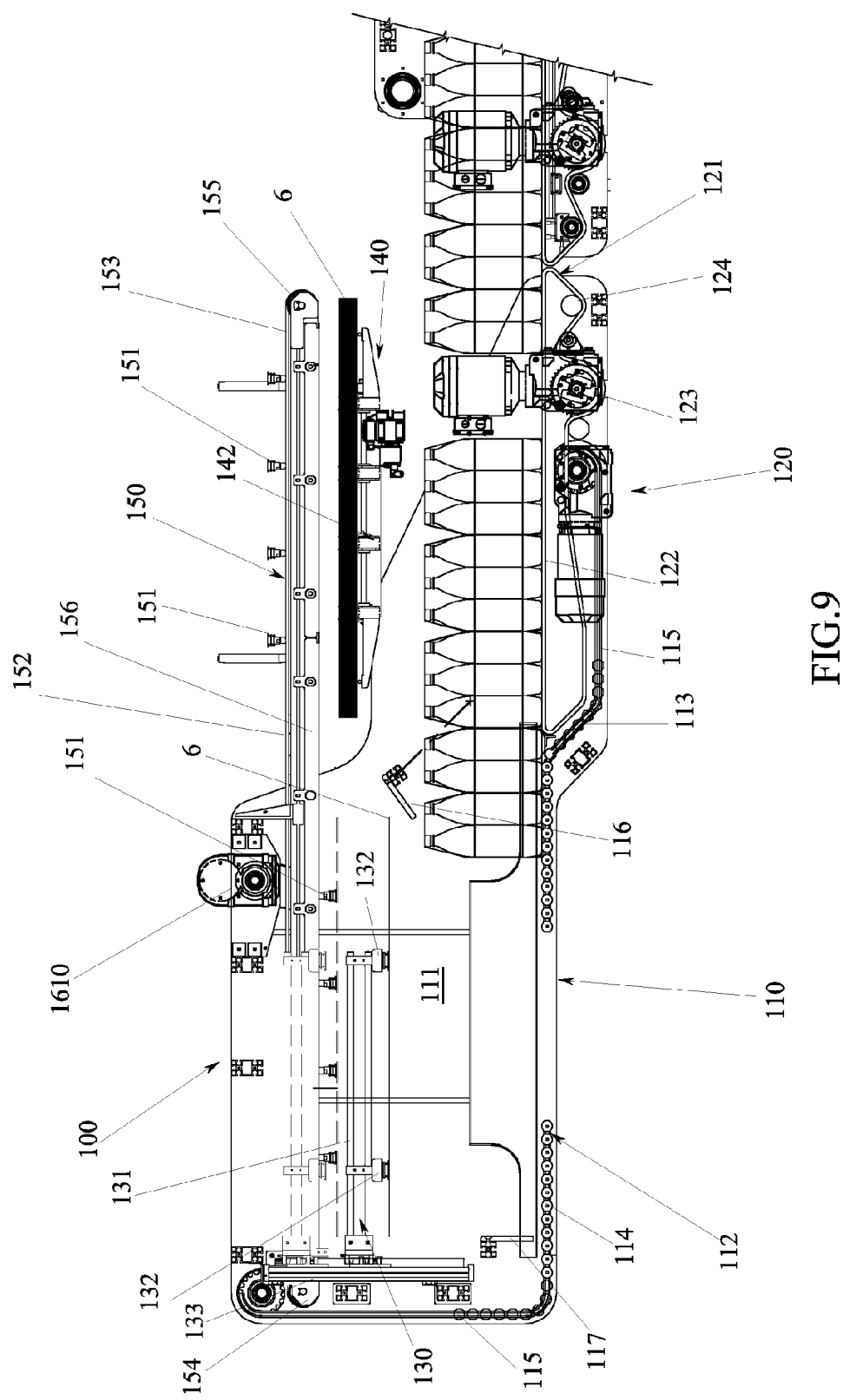
FIG. 9 is the loading device of FIG. 7 in a third operating configuration.

The storage plane 140 is preferably vertically mobile in synchrony with the loading device 100 by means of suitable motors, along vertical guides associated to a fixed upright 141 (see FIG. 6) supported by the portal structure 17 comprising the two vertical columns 18 which enable vertical translation of the loading device.

The storage plane 140 advantageously comprises a further conveyor belt 142 suitably motorized and defining a horizontal advancement plane of the stack of cardboard sheets 6 able to move it along a perpendicular direction to the advancement direction of the layer of loads 4 on the conveyor belt 121.

In practice the further conveyor belt 142 is superposed in plan on and suspended at a distance from the conveyor belt 121, remaining substantially equidistant therefrom even during the vertical motion of the loading device 100.

The further conveyor belt 142 can receive the stack of cardboard sheets 6 from a usual conveyor device of stacked sheets, by interposing a counter and stacker device that defines a stack of a predetermined number of cardboard sheets 6 centred on the further conveyor belt 142, not illustrated in detail herein.

The loading device 100 further comprises conveyor means 150 of a cardboard sheet 6 at a time, which comprise a gripping system that can collect a cardboard sheet 6 at a time from the stack of cardboard sheets 6 arranged on the further conveyor belt 121, for example by collecting from above the sheet located superiorly on the stack, and a translation system of the cardboard sheet 6 collected, which are able to bring the cardboard sheet 6 into an unloading position, in which the cardboard sheet 6 is substantially superposed in plan on the first layer of loads 4 which is positioned resting on the shutter 112.

The gripping system comprises at least a plurality of first suckers 151 which can be arranged in a loading position, in which they are superposed in plan view on the stack of cardboard sheets 6 stacked on the further conveyor belt 142, for collection from above of the uppermost cardboard sheet 6 by effect of the suckers.

In practice, the translation system, which is able to translate the first suckers 151 alternatively between the loading position and the above-cited unloading position, comprises a conveyor belt (FIG. 11) fixed to the lateral flanks 111 of the loading device 100.

In practice, the conveyor belt 152 is superposed in plan view on the storage platform 120 and the upper platform 110, such that the first suckers 151 in the loading position are superposed on the storage platform 120 and in the unloading position on the upper platform 110.

The conveyor belt 152 comprises one or more flexible belts 153 (in the illustrated example two), loop-closed and each wound about a drive roller 154 (connected to a respective motor) and a driven roller 155 rotatably associated to the lateral flanks 111.

One or more groups of first suckers 151 are associated to each belt 153, aligned along the longitudinal direction of the belt 153 (in the example two distinct groups of five first suckers 151 are shown for each belt 153).

The belt conveyor 152 comprises a tubular frame comprising, for each belt 153, at least a longitudinal member 156 having a substantially C-shaped transversal section, each respectively parallel to the lower tract of the belt 153, and located above it.

Each belt 153 when sliding internally of the longitudinal member 156 is in practice able to close (substantially sealingly) a longitudinal chamber 157 (as visible in FIG. 11) defined between the internal walls of the longitudinal members 156 and the internal wall of the belt 153, which is placed in slight depression by a suitable aspirating group (not illustrated) set in communication with the longitudinal chamber by means of suitable branchings, not illustrated.

Each first sucker 151 is associated to the belt 153 in such a way as to project externally of the external wall of the belt.

In practice, each first sucker 151 comprises a deformable cup 158 in which a conduit 159 opens, which is able to be inserted snugly internally of a through-hole made in the belt 153 and fixed thereto.

The conduit 159 is therefore able to set in fluid communication the longitudinal chamber 157 with the internal volume of the deformable cup 158 such as to generate a slight depression about it and to thus be able to attract and retain, by suction effect, a cardboard sheet 6 arranged below the first suckers 151.

In practice, each group of first suckers 151, when facing downwards at the lower tract of the bet 153, can collect a cardboard sheet 6 from the stack of sheets rested on the storage plane 140 and bring it to the unloading position, in which it superposes in plan view and at a distance from the shutter 112.

The positioning organ 130 comprises at least a horizontal arm 131 (in the example two in number and parallel and coplanar) which is associated slidably with the lateral flanks 21 of the loading device 100 by means of vertical guides 133; this arm 131 can be arranged in the interspace present between the belts 153 of the conveyor belt 152 with the longitudinal axis substantially parallel to the longitudinal axis of the belts.

Each arm 131 is vertically mobile between a raised position, in which it is at a higher level than the level of the first suckers 151 when they are in the unloading position, and a lowered position, in which the arm 131 is resting on the first layer of loads 4 with a cardboard sheet 6 interposed.

Each arm 131 is inferiorly provided with at least a second sucker 132 (two in the illustrated example) facing downwards; in the raised position the second sucker 132 is at a higher level than the first suckers 151, while in the lowered position it is at a lower level than them.

In practice, in passing from the raised position to the lowered position the arm 131 and therefore each second sucker 132 comes into contact from above with the cardboard sheet 6 which is maintained in the unloading position from the first suckers 151 and, when collecting the cardboard sheet, draws it to rest on the first layer of loads 4 located on the shutter 112 in the closed configuration.

The end of each arm 131 constrained to slide along the vertical guides 133 fixed to the lateral flanks 21 is activated upwards by a linear actuator (not illustrated), while it is free to slide downwards by effect of the weight force acting on the arm 131, thus in any case maintaining the arm substantially horizontal, up to resting on the first layer of loads 4. The arm, alternatively, might be commanded in translation in the two directions by a suitable actuator.

The vertical guides 133 exhibit a lower extra-run so as to enable a further vertical translation of the arm 131 downwards, such that it can accompany the "free" fall of the first layer of loads 4 when the shutter 112 is opened, while staying supported on the first layer of loads 4 by interposing of the cardboard sheet 6.

The palletizing plant 1 (see FIG. 1) further comprises a conveyor and grouping line 2 of loads 4 to be palletized, which comprises, for example, a linear conveyor and handlers able to position the loads 4 such as to group them in single layers of loads separated from one another and able to optimize the position thereof as a function of the support area made available by a pallet 5.

In the illustrated example (FIG. 2) the conveyor and grouping line 2 is positioned at a higher level (though not by much) with respect to the lower plane 15.

In practice, the conveyor and grouping line 2 is located upstream of the palletizing device 10 with respect to the advancement direction of the loads 4 along the conveyor and grouping line.

Further, the palletizing plant 1 comprises a follower platform 3, which is interposed between the conveyor and grouping line 2 and the palletizing device 10.

The follower platform 3 (FIG. 2) is vertically mobile independently of the palletizing device 10 and can be arranged, alternatively, substantially coplanarly and aligned (substantially continuously) to the conveyor and grouping line 2, such as to enable unloading of a layer of loads 4 from the linear conveyor of the conveyor and grouping line, and substantially coplanar and aligned (substantially continuously) to the palletizing device 10 (in the instantaneous position thereof) such as to enable loading the layer of loads 4, temporarily resting on the follower platform 3, onto the storage platform 120 of the palletizing device 10.

In practice the follower platform 3 comprises a mobile plane 31, for example a conveyor belt or the like, which is associated to a frame 32 slidably associated to a pair of fixed vertical guide bars 33, for example, to the portal structure 17 to which the vertical columns 18 supporting the loading device 100 are fixed.

The follower platform 3 is activated in vertical translation by independent motors, for example provided with encoders, which follow the positioning/vertical translation of the loading device 100.

The functioning of the palletizing plant 1 is the following.

At the start, the empty pallet 5 stations on the motorized roller plane 16 in the loading position.

The empty follower platform 3 is at the height of the conveyor and grouping line 2. The empty loading device 10 finds the shutter 112 of the upper platform 110 in the closed configuration at the height of the follower platform 3.

At this point three successive layers of loads 4 advance from the line 2 and position respectively on the upper platform 110, the storage platform 120 and the follower platform 3.

The following events then contemporaneously occur.

The loading device 100 lowers down to placing the shutter 112 just above the pallet 5; the shutter 112 opens to deposit the layer of loads on the pallet 5, the loading device 100 and the follower platform 3 are raised by a quantity equal to the height of the layer of loads 4, the shutter 112 closes again while the follower platform 3 sends the layer of loads 4 onto the storage platform 120.

The follower platform 3 continues to rise such as to bring itself to the height of the line 2, where it receives a new layer of loads 4 and the storage platform 120 sends the layer of loads 4 onto the upper platform 110.

While the upper platform 110 (shutter 112) is re-opening, re-closes and rises, the follower platform 3 arrives with a new layer of loads 4 and sends it onto the storage platform 120.

The cycle is repeated.

At substantially the same time as the transfer of the first layer of loads 4 from the storage platform 120 to the upper platform 110 the gripping means (the first suckers 151) collect a cardboard sheet 6 from the pile of sheets lying on the storage plane 140 (see FIG. 8) and the conveyor means 150 take it from the loading position to the unloading position (see FIGS. 7, 9, 10 in a broken line), such that as soon as the first layer of loads 4 is resting on the closed shutter 112 the positioning organ 130 positions the cardboard sheet 6 on the first layer of loads 4 (see FIGS. 7, 9, 10 in the unbroken line), reducing to a minimum the waiting times of the positioning of the cardboard sheet 6 on the layer of loads 4 available for arranging on the pallet 5.

From the above it is clear that once the plant is working at operating speed the operations of stacking a layer of loads 4 on the pallets 5 and depositing a further sheet of cardboard 6 are carried out substantially contemporaneously with respect to the unloading operations of a layer of loads 4 from the conveyor and grouping line 2, thus saving time and obtaining a greater productivity of the palletizing plant 1.

Obviously the palletizing plant 1 described above can be subject to numerous modifications of a technical-applicational nature without forsaking the scope of the invention as claimed in the following.

The invention claimed is:

1. A palletizing device (10) comprising a lower plane (15) able to supportingly receive a pallet (5) and a loading device (100) vertically mobile above the lower plane (15) and comprising an upper platform (110), superposed in plan view on the lower plane (15) and provided with a variable-configuration support mechanism (112) and an actuator configured to cyclically move the support mechanism (112) between a closed configuration, in which they define a support for a first layer of products (4) to be palletized, and an open configuration, in which they remove the support in order to release the first layer of products (4) downwards, wherein the loading device (100) comprises a storage platform (120), defining a support for a second layer of products (4) to be palletized, flanked to and rigidly connected to the upper platform (110).

2. The palletizing device (10) of claim 1, wherein the loading device (100) comprises a positioning member (130) configured to position and release a sheet support element (6) onto the first layer of products (4).

3. The palletizing device (10) of claim 2, wherein the loading device (100) comprises a storage plane (140) of at least a stack of sheet elements (6) serving the positioning member (130).

4. The palletizing device (10) of claim 2, wherein the loading device (100) comprises a conveyor mechanism (150) of a sheet element (6) at a time which conveyor mechanism (150) is provided with a gripping system (151) of a sheet element (6) of the stack of sheet elements (6) and a translation system (152) of the gripped sheet element (6), able to bring the gripped sheet element (6) into an unloading position, in which the sheet element (6) is substantially superposed in plan view on the first layer of products (4).

5. The palletizing device (10) of claim 4, wherein the gripping system comprises at least a first sucker (151) able to be arranged in a loading position, in which the first sucker (151) is superposed superiorly to the stack of sheet elements (6), for gripping the uppermost sheet element (6) from above, the translation system (152) being able to translate the first sucker (151) alternatively between the loading position and the unloading position.

6. The palletizing device (10) of claim 5, wherein the first sucker (151) comprises a deformable cup (158) into which a conduit (159) opens, said conduit (159) is associated to an aspirating group able to define a slight depression at the internal zone of the deformable cup (158).

7. The palletizing device (10) of claim 5, wherein the positioning member (130) comprises at least an arm (131) that is vertically mobile between a raised position, in which it is at a higher level than the first sucker (151) in the unloading position, and a lowered position, in which it is resting on the first layer of products (4) with the sheet element (6) interposed.

8. The palletizing device (10) of claim 1, wherein the loading device (100) comprises at least two parallel sides (116, 117), which are associated to an actuator (1610) which can move at least one of the sides (116) horizontally nearingly and distancingly to and from the other side (117), such as to clamp and release the first layer of products (4) which is rested on the support mechanism (112) in a closed configuration.

9. A palletizing plant (1) which comprises at least a palletizing device (10), according to claim 1, a conveyor and grouping line (2) of products (4) to be palletized located upstream of the palletizing device (10) with respect to the advancing direction of the products (4) along the conveyor and grouping line and at least a follower platform (3) interposed between the conveyor and grouping line (2) and the palletizing device (10) is vertically mobile independently of the palletizing device (10) in such a way as to position itself, alternatively, at the level of the conveyor and grouping line (2) for unloading a layer of products (4) therefrom and at the level of the palletizing device (10) for loading the layer of products (4) on the storage platform (120) of the palletizing device (10).

* * * * *